US012625865B2

(12) United States Patent
Ingold et al.

(10) Patent No.: US 12,625,865 B2
(45) Date of Patent: May 12, 2026

(54) METHOD AND SYSTEM FOR AI-BASED INTERACTIVE SEARCHES

(71) Applicants:Dan Ingold, Farragut, TN (US); William George Lawrence Ingold, Farragut, TN (US); Charles DiFatta, III, Farragut, TN (US)

(72) Inventors: Dan Ingold, Farragut, TN (US); William George Lawrence Ingold, Farragut, TN (US); Charles DiFatta, III, Farragut, TN (US)

( * ) Notice: Subject to any disclaimer, the term of this patent is extended or adjusted under 35 U.S.C. 154(b) by 15 days.

(21) Appl. No.: 18/975,494

(22) Filed: Dec. 10, 2024

(65) Prior Publication Data

US 2025/0190425 A1 Jun. 12, 2025

(51) Int. Cl.
*G06F 16/242* (2019.01)
*G06F 16/2455* (2019.01)
*G06F 40/30* (2020.01)

(52) U.S. Cl.
CPC ...... *G06F 16/2423* (2019.01); *G06F 16/2455* (2019.01); *G06F 40/30* (2020.01)

(58) Field of Classification Search
None
See application file for complete search history.

(56) References Cited

U.S. PATENT DOCUMENTS

2007/0179940 A1* 8/2007 Robinson ............ G06F 16/3322
2019/0272296 A1* 9/2019 Prakash ............ G06F 16/24534

2024/0296177 A1* 9/2024 Gardner ................ G06F 40/279
2025/0165775 A1* 5/2025 Sathianathan ............ G06F 8/76

* cited by examiner

*Primary Examiner* — Amresh Singh
(74) *Attorney, Agent, or Firm* — The Rapacke Law Group, P.A.

(57) ABSTRACT

A system for interactive searches based on user queries data and a plurality of Large Language Models (LLMs) including a processor of a Human-Machine Interface (HMI) server node configured to host a network of LLMs and at least one machine learning module (ML) and connected to at least one user-entity node over a network and a memory on which are stored machine-readable instructions that when executed by the processor, cause the processor to: receive a search request input data from the at least one user-entity node; evaluate, by a first dedicated LLM, relevance of the search request input data by discerning between primary and secondary information; responsive to evaluation by the first dedicated LLM, derive classifying features from the primary and secondary information and generate a feature vector based on the classifying features; ingest the feature vector into the ML module configured to extract additional search parameters from a predictive search model based on historical search data associated with the at least one user-entity node; dissect, by a second dedicated LLM, the search request input data and the additional search parameters to separate the data into qualitative and quantitative criteria elements based on the primary and the secondary information; transform, by a third dedicated LLM, the quantitative criteria elements into structured queries for a database; process, by a fourth dedicated LLM, the qualitative criteria elements by searching through a semi-structured data repository; and synthesize, by the fifth LLM, processed search findings into a succinct human-language summary.

20 Claims, 5 Drawing Sheets

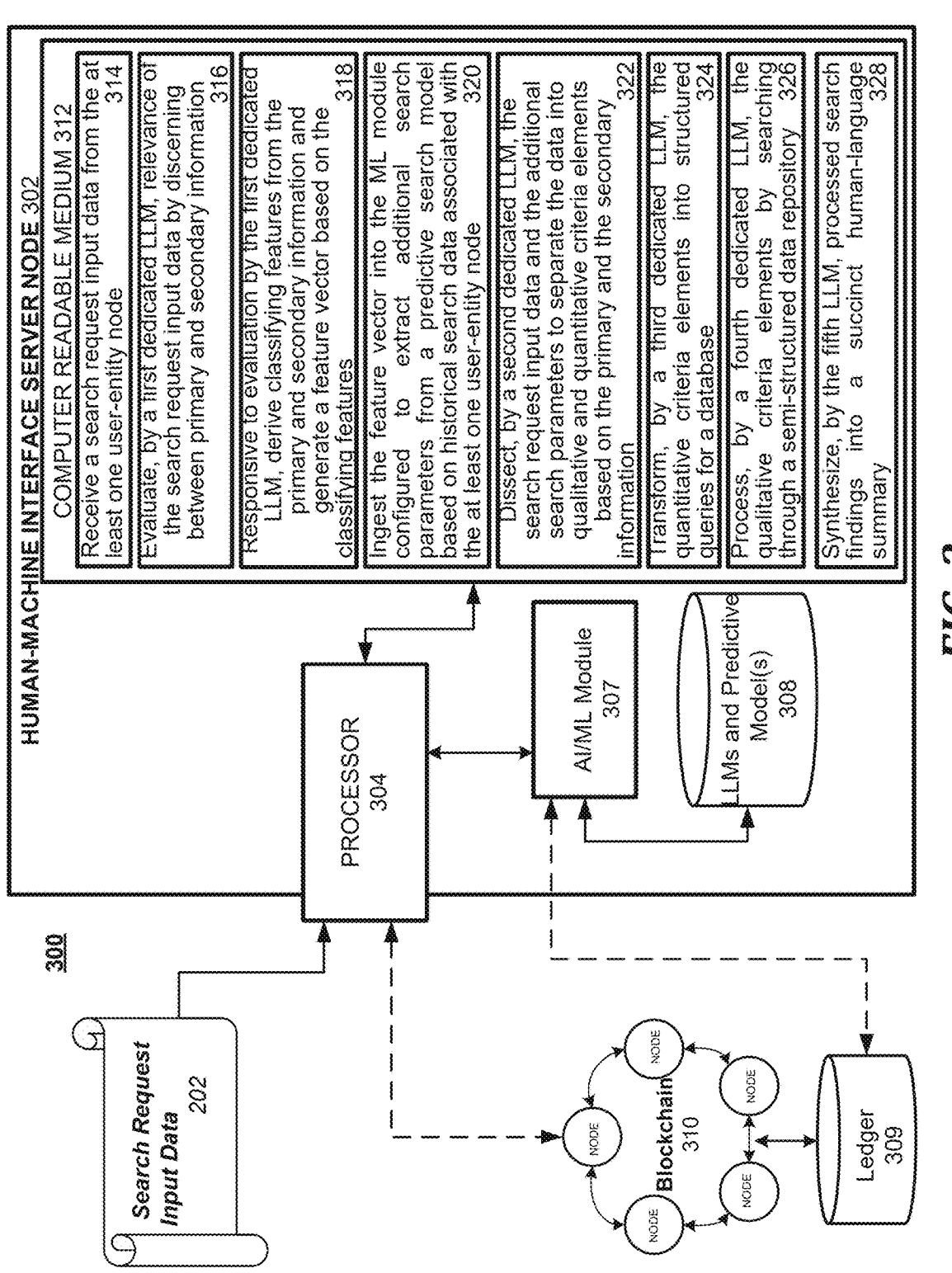

FIG. 3

HUMAN-MACHINE INTERFACE SERVER NODE 302

COMPUTER READABLE MEDIUM 312

Receive a search request input data from the at least one user-entity node     314

Evaluate, by a first dedicated LLM, relevance of the search request input data by discerning between primary and secondary information     316

Responsive to evaluation by the first dedicated LLM, derive classifying features from the primary and secondary information and generate a feature vector based on the classifying features     318

Ingest the feature vector into the ML module configured to extract additional search parameters from a predictive search model based on historical search data associated with the at least one user-entity node     320

Dissect, by a second dedicated LLM, the search request input data and the additional search parameters to separate the data into qualitative and quantitative criteria elements based on the primary and the secondary information     322

Transform, by a third dedicated LLM, the quantitative criteria elements into structured queries for a database     324

Process, by a fourth dedicated LLM, the qualitative criteria elements by searching through a semi-structured data repository     326

Synthesize, by the fifth LLM, processed search findings into a succinct human-language summary     328

PROCESSOR 304

AI/ML Module 307

LLMs and Predictive Model(s) 308

Search Request Input Data 202

Blockchain 310

NODE

Ledger 309

300

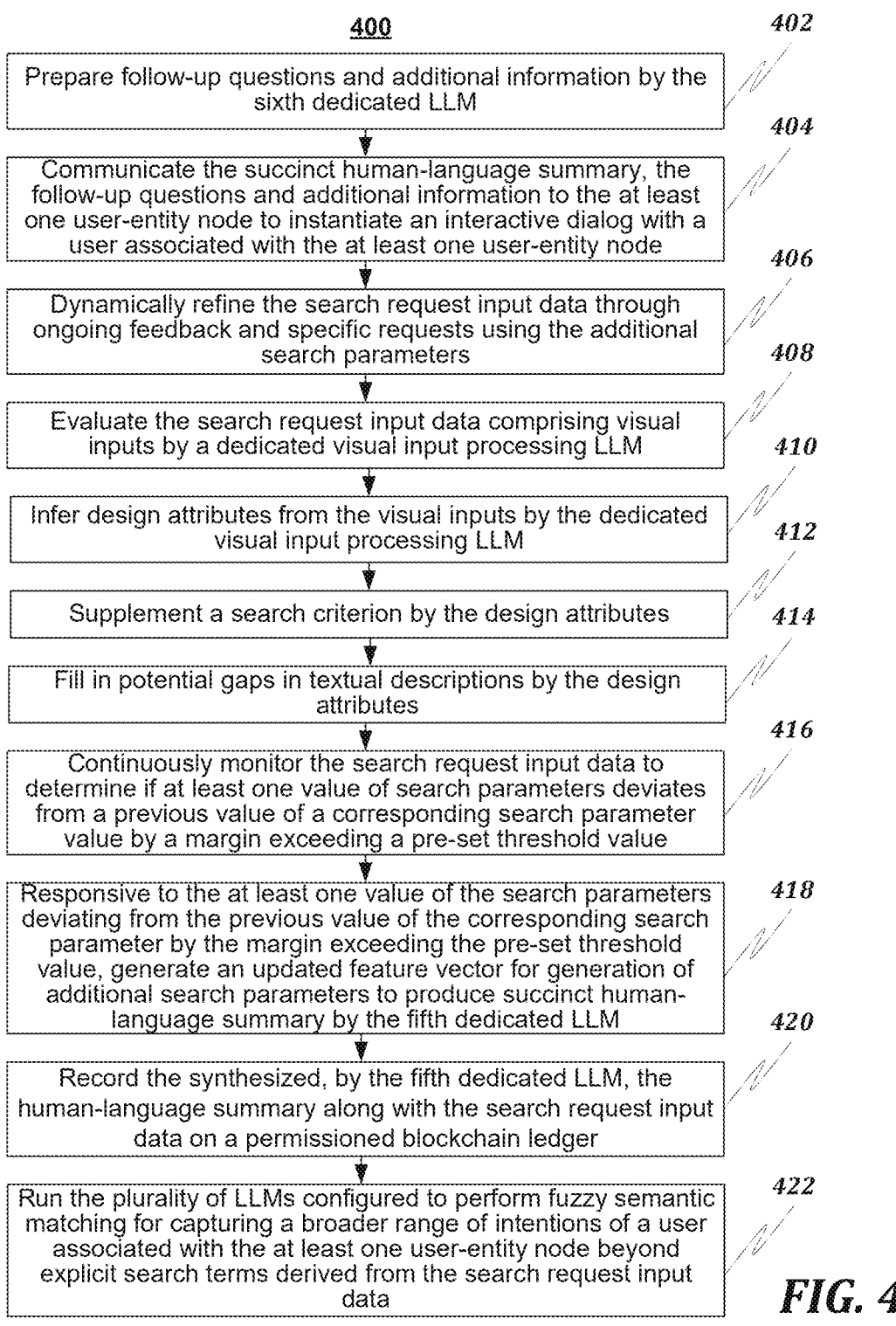

400

402
Prepare follow-up questions and additional information by the sixth dedicated LLM 404
Communicate the succinct human-language summary, the follow-up questions and additional information to the at least one user-entity node to instantiate an interactive dialog with a user associated with the at least one user-entity node 406
Dynamically refine the search request input data through ongoing feedback and specific requests using the additional search parameters 408
Evaluate the search request input data comprising visual inputs by a dedicated visual input processing LLM 410
Infer design attributes from the visual inputs by the dedicated visual input processing LLM 412
Supplement a search criterion by the design attributes 414
Fill in potential gaps in textual descriptions by the design attributes 416
Continuously monitor the search request input data to determine if at least one value of search parameters deviates from a previous value of a corresponding search parameter value by a margin exceeding a pre-set threshold value 418
Responsive to the at least one value of the search parameters deviating from the previous value of the corresponding search parameter by the margin exceeding the pre-set threshold value, generate an updated feature vector for generation of additional search parameters to produce succinct human-language summary by the fifth dedicated LLM 420
Record the synthesized, by the fifth dedicated LLM, the human-language summary along with the search request input data on a permissioned blockchain ledger 422
Run the plurality of LLMs configured to perform fuzzy semantic matching for capturing a broader range of intentions of a user associated with the at least one user-entity node beyond explicit search terms derived from the search request input data

*FIG. 4*

METHOD AND SYSTEM FOR AI-BASED INTERACTIVE SEARCHES

CROSS REFERENCE TO RELATED APPLICATIONS

This application claims priority to Provisional Patent Application No. 63/606,818entitled "Interactive Multi-Mode Human-Machine Interface for Enhanced Product Searches Using Large Language Models" filed on Ser. No. 12/0612,023 and incorporated herein in its entirety.

FIELD OF DISCLOSURE

The present disclosure generally relates to product search applications, and more particularly, to an AI-based automated system and method for real-time searches based on analytics of search inputs and predictive analytics of user related-data.

BACKGROUND

In web-based product searches, a common challenge buyers face is the difficulty of identifying qualified suppliers and consolidating product offerings, particularly in markets characterized by numerous smaller suppliers. Often, these smaller suppliers lack advanced search features on their websites, resulting in subpar search capabilities. On the other hand, large-scale search engines that index these websites tend to yield overwhelming results, making it challenging for users to effectively narrow down their options. While aggregating products from smaller suppliers, even dedicated product search platforms often fall short in supporting qualitative and quantitative search parameters.

A prime example of this challenge can be observed in the search for semi-custom-built homes. Local builders who frequently offer such homes typically maintain basic websites without sophisticated search tools. Major real estate search aggregators like the Multiple Listing Service (MLS) or Zillow only list already built or planned homes on specific lots, omitting designs for unbuilt homes. This situation further complicates the search for non-local buyers trying to identify and evaluate builders and home designs.

Notably, the search for homes, especially custom- and semi-custom-built ones, requires consideration of a blend of hard criteria (quantitative factors such as the number of bedrooms), soft criteria (qualitative aspects like design features), and visual elements (e.g., roofline style). Current systems, including large-scale real estate search engines, lack these comprehensive capabilities.

Accordingly, a system and method for AI-based automated real-time execution of interactive searches based on processing of user search queries data by Large Language Models (LLMs) are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for interactive searches based on user queries data and a plurality of Large Language Models (LLMs) including a processor of a Human-Machine Interface (HMI) server node configured to host a network of LLMs and at least one machine learning module (ML) and connected to at least one user-entity node over a network and a memory on which are stored machine-readable instructions that when executed by the processor, cause the processor to: receive a search request input data from the at least one user-entity node; evaluate, by a first dedicated LLM, relevance of the search request input data by discerning between primary and secondary information; responsive to evaluation by the first dedicated LLM, derive classifying features from the primary and secondary information and generate a feature vector based on the classifying features; ingest the feature vector into the ML module configured to extract additional search parameters from a predictive search model based on historical search data associated with the at least one user-entity node; dissect, by a second dedicated LLM, the search request input data and the additional search parameters to separate the data into qualitative and quantitative criteria elements based on the primary and the secondary information; transform, by a third dedicated LLM, the quantitative criteria elements into structured queries for a database; process, by a fourth dedicated LLM, the qualitative criteria elements by searching through a semi-structured data repository; and synthesize, by the fifth LLM, processed search findings into a succinct human-language summary.

Another embodiment of the present disclosure provides a method that includes one or more of: receiving a search request input data from the at least one user-entity node; evaluating, by a first dedicated LLM, relevance of the search request input data by discerning between primary and secondary information; responsive to evaluation by the first dedicated LLM, deriving classifying features from the primary and secondary information and generate a feature vector based on the classifying features; ingesting the feature vector into the ML module configured to extract additional search parameters from a predictive search model based on historical search data associated with the at least one user-entity node; dissecting by a second dedicated LLM, the search request input data and the additional search parameters to separate the data into qualitative and quantitative criteria elements based on the primary and the secondary information; transforming, by a third dedicated LLM, the quantitative criteria elements into structured queries for a database; processing, by a fourth dedicated LLM, the qualitative criteria elements by searching through a semi-structured data repository; and synthesizing, by the fifth LLM, processed search findings into a succinct human-language summary.

Another embodiment of the present disclosure provides a computer-readable medium including instructions for receiving a search request input data from the at least one user-entity node; evaluating, by a first dedicated LLM, relevance of the search request input data by discerning between primary and secondary information; responsive to evaluation by the first dedicated LLM, deriving classifying features from the primary and secondary information and generate a feature vector based on the classifying features; ingesting the feature vector into the ML module configured to extract additional search parameters from a predictive search model based on historical search data associated with the at least one user-entity node; dissecting, by a second dedicated LLM, the search request input data and the additional search parameters to separate the data into qualitative and quantitative criteria elements based on the primary and the secondary information; transforming, by a third dedicated LLM, the quantitative criteria elements into structured queries for a database; processing, by a fourth dedicated LLM, the qualitative criteria elements by searching through a semi-structured data repository; and synthesizing, by the fifth LLM, processed search findings into a succinct human-language summary.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 3 illustrates a network diagram of a system including detailed features of a Human-Machine Interface (HMI) server node consistent with the present disclosure;

FIG. 4 illustrates a further flowchart of a method for AI-based automated real-time execution of interactive searches based on processing of user search queries data by Large Language Models (LLMs) consistent with the present disclosure;

DETAILED DESCRIPTION

Figure 1:
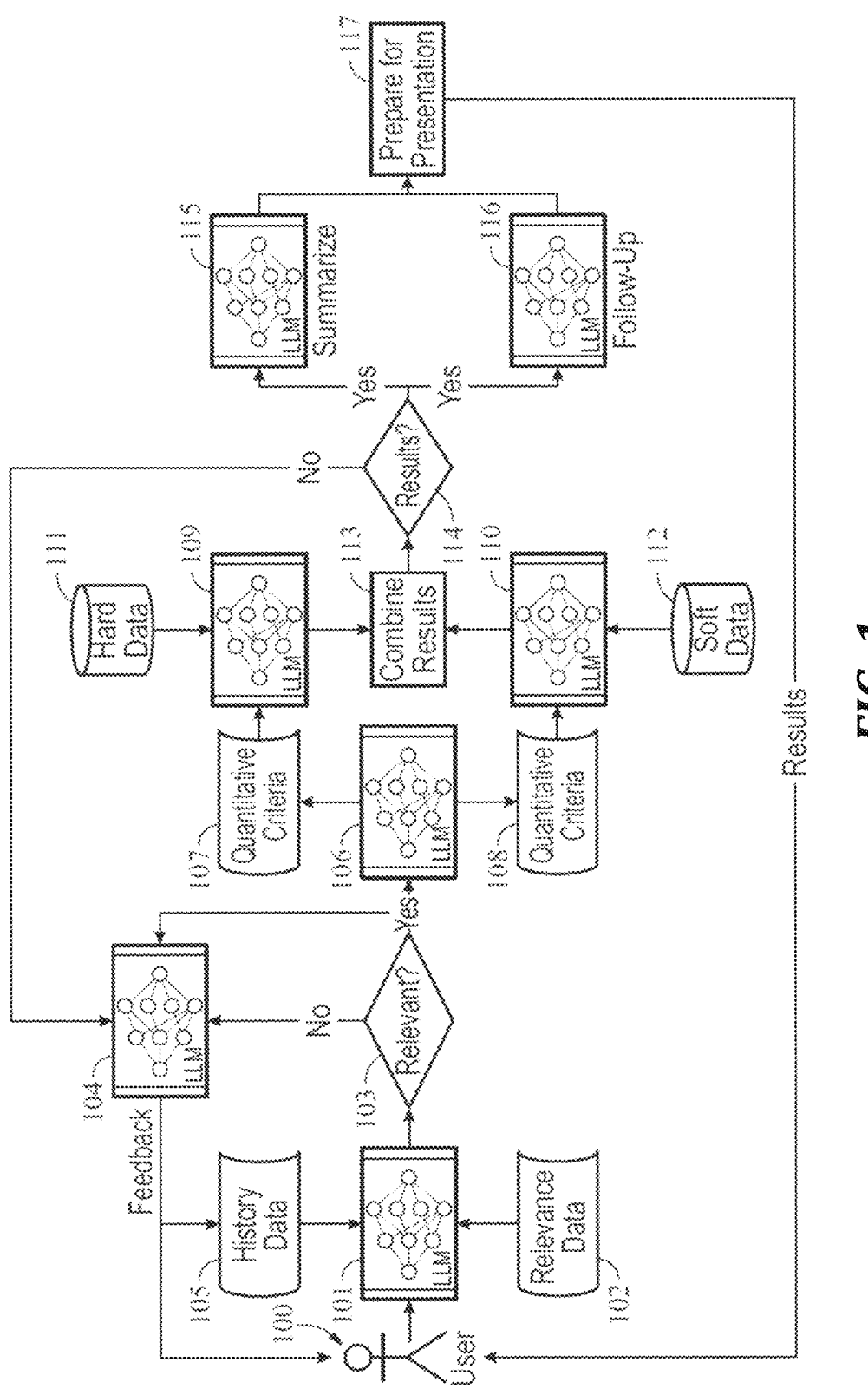
FIG. 1 illustrates an exemplary process flowchart of a system for AI-based automated real-time execution of interactive searches based on processing of user search queries data by Large Language Models (LLMs) consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosed system. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of the predictive generation of search parameter(s), embodiments of the present disclosure are not limited to use only in this context.

The following definitions may be used.

"Classifier feature vector" refers to a mathematical representation of the key classifying features, typically in the form of an n-dimensional vector where each dimension corresponds to a specific feature. This vector is used as input for machine learning algorithms to categorize or analyze the search query.

"Search predictive model" refers to machine learning model trained on historical user search-related data to predict various search criteria that may be used as input into LLMs. This model takes the classifier feature vector as input and outputs predictions about search parameters.

"Search parameters" refer to values that may quantify how the system generates additional intuitive search terms.

"Pre-set threshold value" refers to a predetermined numerical value used as a decision boundary for triggering actions within the disclosed system. This value may be set based on historical data, expert knowledge, or specific search requirements.

The proposed system may address the needs of both the niche semi-custom home market and the broader real estate market as well as any other on-line product markets. The system is beneficial for any product search process that requires a combination of hard and soft criteria discussed in detail below.

In one embodiment, the system introduces an outward-facing Human-Machine Interface (HMI) that facilitates dynamic, bidirectional interaction between users and the system. The HMI allows users to express their preferences and needs in natural, everyday language and/or using visual images. The system communicates its findings through this HMI in human language and/or visually, using images of the selected products where appropriate. The disclosed interface supports continuous user interaction, enabling real-time refinement or expansion of search results, with the system promptly adapting to these changes. The novel aspect that sets the disclosed embodiments apart from the existing technologies discussed in the background section is a utilization of a network of large language models (LLMs) configured to process user queries in human language and generate results in the same format. While complex external-facing LLMs handle user interactions, simpler internal LLMs manage and process results internally. This contrasts with conventional methods that rely on a single machine learning (ML) model exclusively for natural language input without extending this functionality to enhance internal processing or enable natural language output. The disclosed novel networked-model approach significantly enhances the user experience and improves the efficiency and effectiveness of internal processing.

In one embodiment, the disclosed system may employ a machine learning module configured to generate predictive search models that may output additional search parameters that may be used by the dedicated LLMs. The predictive search models may use pre-stored user-related data such as previous recorded searches, user interests (based on user profile) or based on remote data collected from user having the same characteristics such as language, location, gender, age, race, etc.

The disclosed Human-Machine Interface (HMI) system leverages a sophisticated network of large language models (LLMs) enhanced by hardware GPU modules. This system is designed to revolutionize how users engage in product searches, particularly in complex and under-served markets like the semi-custom home industry. It transforms user-provided human language and visual image inputs into a mix of structured and unstructured queries, facilitating a deeply nuanced search process. The system excels in delivering results through detailed human-language descriptions and, when relevant, through visual representations.

The process begins with an LLM specifically dedicated to structuring the human-machine interaction. This dedicate LLM evaluates the relevance of the user's input, effectively discerning between primary and secondary information. In one embodiment that evaluation may be performed by generation of a feature vector/classifier that may be ingested into the ML module for generation of a predictive search model for producing predictive parameters that may be used by the dedicated LLMs. The model ensures that user queries are appropriately understood and categorized, setting the stage for more targeted LLM processing.

Following this, another dedicated LLM within the system steps in to dissect the input, separating it into its qualitative and quantitative elements. This separation is crucial for understanding and addressing the complex criteria users might have, allowing for a more tailored and accurate search experience.

To further refine the precision of the search, the system employs additional LLMs for specific aspects of the query processing. One LLM is responsible for transforming quantitative criteria into structured queries for a database, while another processes qualitative criteria by searching through a semi-structured data repository. This approach includes "fuzzy" (i.e., non-exact) semantic matching, enabling the system to capture a broader range of user intentions beyond the explicit terms used.

An additional LLM is dedicated to processing visual inputs, such as photographs and drawings. This LLM infers design attributes from these visual sources, supplementing the search criteria and filling in potential gaps in textual descriptions. The system adeptly manages the potential for information overload by curating the search results. It presents a well-considered subset of results, incorporating elements of randomness to introduce potential alternative options that align with the user's preferences.

In the concluding phase, another dedicated LLM synthesizes the processed search findings into a succinct human-language summary. Concurrently, another LLM prepares follow-up questions and additional information, aiming to refine future system responses. These summaries and questions are communicated back to the user through the HMI, encouraging an engaging and interactive dialogue. This process allows users to dynamically refine their search criteria through ongoing feedback and specific requests, enabling a thorough exploration of the search space.

In summary, this disclosed embodiments significantly advance the field of search technology. The disclosed method and system stand out for their strategic use of a network of LLMs, each with a specific function in the process, from structuring initial interactions to dissecting and processing input. The system's interactive and dynamic nature greatly improves search efficiency, accuracy, and user satisfaction, particularly in sectors with diverse and intricate search requirements.

As discussed above, within the framework of this disclosure, multiple Large Language Models (LLMs), each with distinct capabilities collectively assume pivotal and multifaceted roles in the system's operation. The external LLMs represent highly sophisticated natural language processing models renowned for their comprehensive language understanding and generation capabilities. Notably, the disclosed system leverages a combination of these LLMs, each carefully selected to provide specific functionalities and features while balancing processing time considerations.

Established interfaces and APIs (Application Programming Interfaces) facilitate seamless interaction between the disclosed system and these external LLMs. These interfaces enable smooth communication, allowing for the exchange of textual data, visual content, and their respective responses. The LLMs' primary functions within the disclosed context encompass processing textual and visual data, generating linguistic insights, and providing contextually appropriate responses. Moreover, the varying capabilities of these LLMs are tuned to their specific use in the disclosed system, striking a balance between processing time and feature richness. Some LLMs may prioritize rapid processing, while others focus on more detailed linguistic analysis and content generation.

Furthermore, the LLMs' extraordinary ability to analyze visual information enables them to formulate descriptive textual representations of photographic and graphical images, drawings, or other visual content, with these capabilities also fine-tuned to meet the system's performance requirements.

Practically, the textual and visual data may be submitted to the selected LLMs, which then employ their deep-learning capabilities to analyze and process this information. The resulting descriptive textual content effectively conveys the meaning and details of both textual elements. These descriptions are seamlessly integrated into the system's workflow, opening the door to diverse applications, including content retrieval, image indexing, accessibility enhancement, and comprehensive information interpretation. The strategic choice of multiple LLMs, each optimized for specific functionalities and performance characteristics, aligns with the disclosed system's objectives of delivering advanced natural language processing and visual content understanding. By leveraging the LLMs' extensive knowledge and linguistic prowess, the system excels in interpreting, describing, and communicating diverse forms of information.

In one embodiment, the present disclosure provides a system, method and computer-readable medium for AI-based automated system and method for real-time searches based on analytics of search inputs and predictive analytics of user related-data. In one embodiment, the system overcomes the limitations of existing methods of using a combination of a network of LLMs and fine-tuned predictive model(s) to process the search query-related information, irrespective of data format, style, or data type.

In one embodiment, responsive to the evaluation of the user query input by the first dedicated LLM, the system may derive classifying features from the primary and secondary information of the user query input and may generate a feature vector based on the classifying features. Then, the feature vector may be ingested into the ML module configured to extract additional/intuitive search parameters from a predictive search model based on historical search data associated with the user who is providing the search query inputs. By leveraging the capabilities of the network of LLMs and predictive models, the disclosed approach offers a significant improvement over existing solutions discussed above in the background section.

In summary, while the seamless integration and utilization of individual LLMs is fundamental to the novel system's functionality. The use of multiple LLMs, with varying capabilities and tuned performance, significantly enriches the system's natural language processing and comprehensive information processing capabilities, striking an optimal balance between feature richness and processing efficiency.

In one embodiment, the system may not only be viewed as just containing a network of LLMs, but rather as being composed of a set of Collaborating Agents, some of which are implemented using the dedicated LLMs as well as predictive models. The design of the disclosed system may allow the replacement of any given Agent with other models, for example, a Machine Learning (ML) model.

A Service is a grouping of one or more Agents tailored to a specific aspect of the system's workflow. Work is split among Agents, each tailored and dedicated to fit the Service's processing needs according to the required task. A Service can be considered a "black box" Agent that can participate in other Services. The workflow amongst Agents forms an arbitrary graph of processing flow. Some groups of Agents operate in parallel to speed the computation of their results. Other groups of Agents operate in series to successively refine their partial work products as the processing proceeds.

The Agents may be divided into four broad categories: Planners, Workers, Evaluators, and Arbitrators.

Planners create parallelizable or sequential work plans farmed out to Worker agents.

Workers execute a distinct element of the processing workflow.

Evaluators take the Workers' results and decide whether those results are satisfactory or need to be replanned.

Arbitrators take the results of Workers and can combine or choose among those results.

The disclosed system currently employs about twenty Agents. However, the specific number of Agents used is arbitrary, and the pattern described above allows the tailoring of the number and capabilities of Agents to different problem sets. The Disclosed system employs six Services: Conversation, Desire Tracking, Qualitative Evaluation, Quantitative Evaluation, Personal Inference and Tracking, and Arbitration. A related part of the disclosed system handles data preparation for use in the system and includes four Services: Textual Analysis, Graphical and Photographic Analysis, Relationship Graph Deduction, and Summarization.

The Conversation Service employs two Agents, as follows:

A Contextual Agent contextualizes and disambiguates each human-language User message for the specific problem domain (for example, real estate services) so that it is understandable by all other system Services. This process allows other system Agents to be independent of the specifics of the User dialogue and protected from irrelevant user input.

A Personality Agent embodies a particular conversational style and vocabulary to customize the System/User conversation for particular applications and retains a memory of prior interactions to enable a human-like dialogue style.

The Desire Tracking Service uses three Agents, as follows:

A Planner Agent breaks down a user message into work that it assigns in parallel to two Worker Agents:

A Design Agent determines the likes and dislikes of the User with respect to overall choice among the potentially matching products or services;

A Feature Agent determines the likes and dislikes of the User with respect to the specific attributes of a given product or service, which may or may not span Designs;

The result of the Design and Feature Agents is a graph database that represents the relationship among design choices and feature attributes and the degree of like and dislike that the User has expressed for each.

However, these Design and Feature concepts are arbitrary and represent the two abstraction levels appropriate to this instance. Our idea is extensible to further levels that better represent more complex products and services. For example, in a real estate context, the Designs might represent home style, while the Features represent specific elements of a given Design. New levels could be extended to include concepts that span Designs, such as location.

The Qualitative Evaluation Service comprises seven Agents, as follows:

A Planner Agent breaks down a user message into assignable work for the other Workers in this Service.

A Relatedness Agent determines whether a user message relates to the qualitative side of the evaluation and stops further evaluative processing if it does not.

Multiple Worker Agents subdivide the effort of making qualitative comparisons and are tailored to the breadth of tasks necessary for that evaluation. For example, in a real estate context, separate Workers qualitatively compare designs, represent holistic design knowledge, extract qualitative search terms, and search for the specified terms.

An Evaluator Agent takes the results of the Workers and judges whether that result fulfills the intent of the message or request that initiated the Service.

The Quantitative Evaluation Service employs a single Agent:

This Agent contains knowledge about the quantitative fields available for searching, and interprets a human language input to determine the fields to be searched and the criteria for matching.

The Agent forms and executes database queries that fit User's query, and returns the results for further processing.

The Agent can expand in capability as the quantitative data variety grows in complexity.

The Personal Inference and Tracking Service includes four Agents:

A Relatedness Worker first determines if a message contains personal information about the user. If so, a Dissection Worker breaks down elements of this personal information and extracts the pertinent elements. Some elements may represent information about the user's desires or intentions, whereas others may provide personal or demographic information about the user or metadata about the user's needs.

An Inference Worker then infers potential features of a design or product that may fit the User's needs. The Inference Worker can request additional information from the User to clarify intent or content.

Finally, a Tracking Worker (not an LLM) stores the extracted personal information in a database that tracks the relationships and values of various personal data items. This open-ended database can represent a growing set of arbitrary relationships among its data elements and becomes the basis for the Digital Twin that a human agent can later interrogate.

The Personal Inference and Tracking Service is designed to evolve with the complexity of the product or service space and improve the quality of follow-up questioning.

The Arbitration Service comprises two Agents:

A 'Master' Planner Agent that knows the general capabilities of the system as a whole (i.e., all the Services), and thereby chooses which Services to route any particular message to.

A 'Master' Evaluator Agent judges whether the results of each Service properly address the input message, and ranks the quality of the results among all of the replying Services.

The system design may not follow a predetermined decision-making flow of control and data. The decisions about which Services apply to a given User message are decentralized and parallelized. Incoming messages are frequently sent to multiple recipient Services in parallel, each of which decides whether and what portions of the message apply to that Service's functionality. In turn, those Services can flow their information into other Services to emulate human-like reasoning about the results.

When evaluating a product or service that a realization of the disclosed system contains, the disclosed system extracts information that would be non-obvious to a human observer and enables that information to become a searchable attribute or concept of the described product or service. This extraction encompasses the similarity of related concepts without requiring exact matches between them using predictive parameters.

The disclosed system further abstracts, identifies, and tracks elements of relatedness among concepts that are not evident in the data. This enables the disclosed system to find elements of commonality amongst diverse items and infer how user desires and intents in one area might apply to others. Over time, the disclosed system learns the relationships amongst the elements of its data sets, including the product or service including the items to be searched and the desires and intents of the users who use it, by using an AI/ML model. It continually expands this understanding of interrelationships throughout its operation and training.

The non-obvious data and relationships that the disclosed system extracts enable it to predict user desires and intents, and infer additional tacit information about the user. Over time, the disclosed system creates a digital twin of each user that comprises demographic data, the user's expressed desires and intents, and inferences the disclosed system derives about the user. A human agent can examine and interrogate this digital twin to gain an in-depth understanding of the user that otherwise would be impossible or time-consuming to construct through direct human interaction with the user.

In one embodiment, to enhance this process, the system may integrate advanced technologies discussed above, such as Artificial Intelligence (AI) and machine-learning (ML) and Blockchain. The AI may be leveraged for several key functions in the following manner discussed herein.

Additionally, the disclosed query processing system may incorporate Blockchain technology to ensure the transparency and immutability of transactions, providing a secure and trustworthy platform. By embedding these advanced technologies, the disclosed system for processing the search queries, advantageously, offers a sophisticated and secure solution.

As discussed above, in one disclosed embodiment, the AI/ML technology may be combined with a blockchain technology for secure use of the user search query-related data and predictive search data. In one embodiment, a blockchain consensus may need to be implemented prior to provision of the final search parameters and/or report to dedicated LLM or to return search results to a requesting user.

In one embodiment, the ML module may use search predictive model(s) that use an artificial neural network (ANN) to generate search parameters. The use of specially trained ANNs provides a number of improvements over traditional methods of search query processing, including more accurate prediction of the additional intuitive search query parameters. The application further provides methods for training the ANN that leads to a more accurate search predictive model(s).

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network having an input layer, an output layer, and several fully connected hidden layers. The proposed ANN may be particularly useful in production of the search parameters because the ANN can effectively extract features from the user-related data in linear and non-linear relationships. In some embodiments, the proposed ANN may be implemented by an application-specific integrated circuit (ASIC). The ASICs may be specially designed and configured for a specific AI application and provide superior computing capabilities and reduced electricity and computational resources consumption compared to the traditional CPUs.

FIG. 1 depicts an exemplary process flowchart of a system for AI-based automated real-time execution of interactive searches based on processing of user search queries data by Large Language Models (LLMs) consistent with the present disclosure.

Referring to FIG. 1, the example network workflow includes a user 100 interacting with the system's user interface, which allows human-language dialog using the capabilities of a Large Language Model (LLM) 101. This interaction is implemented through a written text, although embodiments of the LLM (101) may allow spoken verbal or visual inputs and outputs. Further, the system's responses may include visual representations of items that match the user's criteria. A human-machine interface LLM 101 processes the user's input, using both the history of prior user interactions 105 and the relevant context of the system 102 to recognize the input and ensure it is in the appropriate context for the embodied domain.

The LLMs described herein may be implemented as multiple distinct models or as a single model provided with distinct contexts at run time. The diagram makes illustrations of these instances distinct to clarify the information flow. Without changing the substance of this disclosed system, any of these models may be internal or external constructs of differing dimensionality as suited to the context and required processing power for the embodied domain.

If the user request is deemed not relevant at 103 to the context, a human-machine interface LLM 104 provides appropriate feedback in human language to the User (100) and updates the historical context of user interactions (105).

Relevant requests are forwarded to an internal-processing LLM (106) for dissection into quantitative (hard) criteria (107) and qualitative (soft) criteria (108) components and translation into a machine-readable form that facilitates further processing. An internal-processing LLM (109) formulates the quantitative criteria (107) into a standard database query, notionally (but not necessarily) using a structured query language (SQL) notation. This query is used to search the hard-criteria database (11) for matching items. An internal-processing LLM (110) uses the qualitative criteria (108) to search a vector data store (112) for matches of semantically similar terms to those the user (100) has expressed. This approach allows both ambiguity and informality in the user's requests by matching data that represents the intention of the user rather than an exact specification. Further, this LLM may incorporate a degree of randomness to expand matches beyond the exact specification of the user's query.

The soft-and hard-criteria search results are combined (113), and the results are evaluated for satisfactory content. These results may include both textual descriptions and visual images of items matching the user's (100) request. If the results are excessive or null (114), the invention uses a human-machine interface LLM (104) to provide human language feedback to the user (100) with instructions to narrow or expand their request, and updates its history (105) of the conversation. Alternatively, if excessive results are obtained, the system may also respond with a subset of the matching items. The human-machine dialog continues with Step 1. An internal-processing LLM (115) examines the combined results (113) and summarizes them into concise human language to reduce the textual volume and cognitive load of information relayed to the user. Simultaneously, an internal-processing LLM (116) examines the combined results (113) and may formulate follow-up questions for or statements to the user (100). This follow-up information serves to explain the results or seeks further user guidance to narrow or expand them. The summarized results, follow-up statements, and questions, if any, are combined and prepared for presentation (117) back to the user (100). Such a presentation may include both textual and visual representations of the results. The human-machine dialog then continues with Step 1.

This concludes the overview of the processing steps during the routine operation of the invention. The following narrative details the pre-processing steps used to prepare the hard database (111) and soft data store (112) that the invention employs. The process depicted in FIG. 1 represents an exemplary workflow that does not take into account the implementation of predictive models that may arbitrary change the workflow based on the predicted search parameters to be processed by the LLMs.

Figure 2:
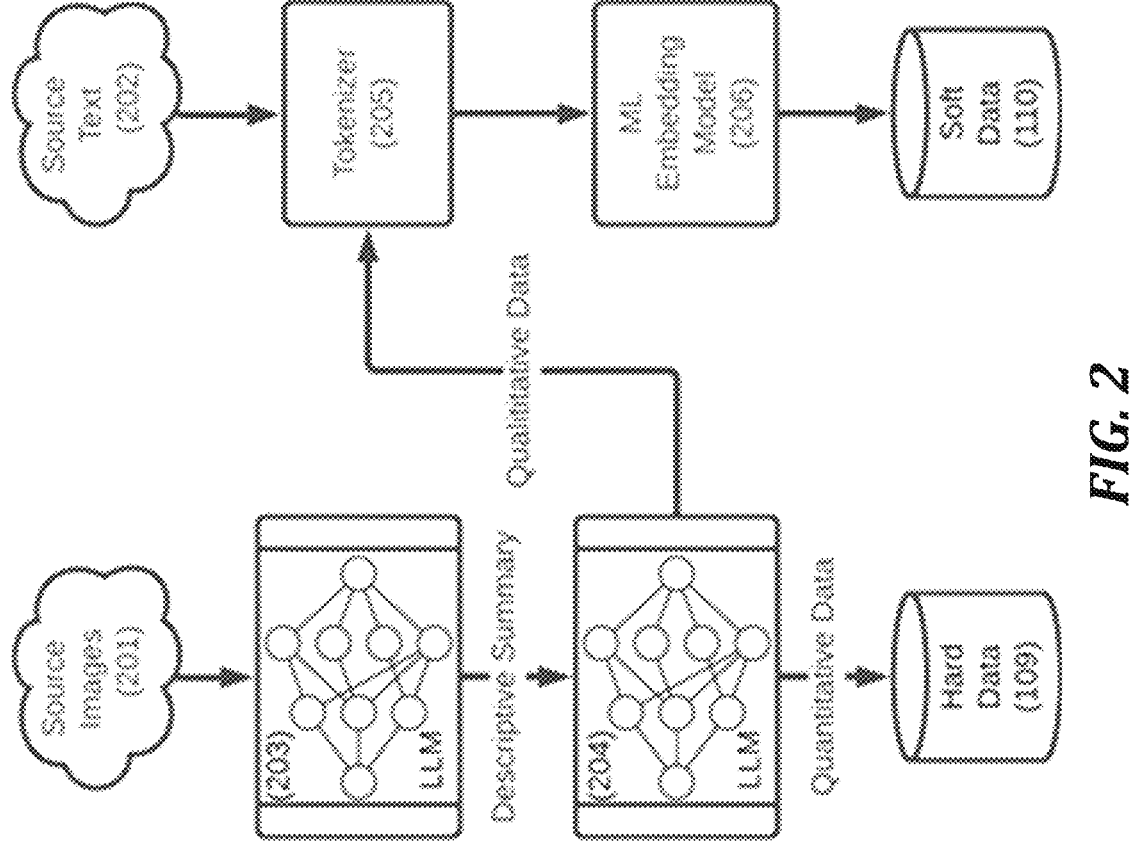
FIG. 2 illustrates an exemplary flow chart for pre-processing steps used to create the hard-data database and soft-data vector data store consistent with the present disclosure.

FIG. 2 illustrates an exemplary flowchart for pre-processing steps used to create the hard-data database and soft-data vector data store consistent with the present disclosure.

Referring to FIG. 2, the pre-processing steps used to create the hard-data database (111) and soft-data vector data store (112) are shown. The hard-data database (111) and soft-data vector data store (112) represented data source processing inputs to the main system in FIG. 1. These pre-processing elements are an integral part of the disclosed system and represent a novel approach for extracting data from image (201) and textual (202) sources and enabling it for searching.

Referring to FIG. 2, the flowchart includes two processing steps fundamental to the disclosed system, but implemented using external libraries that are not a part of this innovation: the tokenizer (205) and the ML embedding model (206). Two dedicated sections describe these elements after the following discussion of the pre-processing steps to assist in understanding of the relationship of these components to the disclosed system.

Source data external to the disclosed system, including information specific to the embodied domain, includes both image (201) and textual (202) data. These data items are collected and presented to the pre-processing steps for encoding and subsequent use by the disclosed system. Textual source data (202) is processed by a tokenizer (205), which segments the text input into discrete semantic units—words, phrases, and symbols. The tokenized output undergoes processing through a Machine Learning (ML) embedding model. This model is employed to encode the tokens into a specialized format optimized for storage within a vector database of soft data (112), a critical component used in the execution of this disclosed system. Similar to Step 1, source visual data (201), which may include photographs, drawings, plans, and similar data, exists to illustrate a product but lacks textual descriptions. The visual data is fed to an LLM (202) that analyzes the visual medium and produces a textual description of its contents, which may include details of visual design elements and other characteristics.

The textual description output is fed to an LLM (204) (similar in purpose to LLM (106) in the main part of the disclosed system) that dissects the description into quantitative (hard) data and qualitative (soft) data. The hard data is stored in a database (111) for use in the primary processing of the disclosed system. The soft data output from the dissection, representing a textual narrative description, is sent to the tokenizer (205) for further processing, as described in Step 2 above. The ML embedding model (206) processes the tokenized output and stores the resulting vectorized output in the soft data store (112) for use in the primary processing of the disclosed system.

A tokenizer (205, step 2) assumes a central role in the system's data processing within the framework of this disclosed system, although it is implemented as a processing task based on an established library rather than developed as a part of this innovation. The tokenizer operates as a key internal component, designed to systematically analyze and segment input text data into discrete units, such as words, phrases, or symbols, while considering the specific linguistic characteristics of the processed language. This segmentation process is critical for subsequent natural language processing tasks and allows for the precise analysis and manipulation of text data.

The tokenizer's functionality is optimized for accuracy and efficiency, leveraging a well-established library to perform its tasks. This library-based approach ensures the tokenizer adheres to text analysis's best practices and industry standards. In operation, the tokenizer processes incoming textual data generated by users or obtained from various sources within the disclosed system's architecture. It then dissects this data into constituent units, which can be used for multiple downstream tasks, such as language translation, sentiment analysis, information retrieval, and content summarization, among others. The tokenized output is foundational for further linguistic analysis and data manipulation within the disclosed system's workflow.

The tokenizer's seamless integration into the disclosed system's architecture ensures efficient and reliable text processing, contributing to the overall effectiveness and functionality of the disclosed system's natural language processing capabilities. In summary, the internal tokenizer, based on a library and not developed as a part of this disclosed system, is a crucial processing task designed to dissect input text data systematically. Its integration into the disclosed system's architecture optimizes text analysis, enhancing the overall capabilities of the disclosed system's natural language processing and information processing components FIG. 3 illustrates a network diagram of a system including detailed features of a Human-Machine Interface (HMI) server node consistent with the present disclosure.

Referring to FIG. 3, the example network 300 includes the HMIS server node 302 connected to a user entity node (not shown) to receive the search query request input data 202.

The HMIS server node 302 is configured to host an AI/ML module 307. The HMIS node 302 may receive the search request data 202 and pre-stored historical user-related data retrieved from the local and/or remote databases. As discussed above, the pre-stored user-related data may be retrieved from the ledger 309 of the permissioned blockchain 310.

The AI/ML module 307 may generate the search predictive model(s) 308 based on the received search request data 202 provided by the HMIS server node 302. As discussed above, the AI/ML module 307 may provide predictive outputs data in the form of additional search parameters for a given search request. The HMIS server node 302 may process the predictive outputs data received from the AI/ML module 307 to generate the updated search request data.

In one embodiment, the HMIS node 302 may continually monitor the search request data and may detect a parameter that deviates from a previous recorded parameter (or from a median reading value) by a margin that exceeds a threshold value pre-set for this particular parameter. For example, if the search query parameters change significantly, this may cause a change how the search is processed by the HMIS node 302. Accordingly, once the threshold is met or exceeded by at least one parameter of the search query data, the HMIS node 302 may provide the currently acquired search-related parameter to the AI/ML module 307 to generate an updated predictive search parameters(s) based on the current input data.

While this example describes in detail only one HMIS server node 302, multiple such nodes may be connected to the network and to the blockchain 310. It should be understood that the HMIS server node 302 may include additional components and that some of the components described herein may be removed and/or modified without departing from a scope of the HMIS server node 302 disclosed herein. The HMIS server node 302 may be a computing device or a server computer, or the like, and may include a processor 304, which may be a semiconductor-based microprocessor, a central processing unit (CPU), an application specific integrated circuit (ASIC), a field-programmable gate array (FPGA), and/or another hardware device. Although a single processor 304 is depicted, it should be understood that the HMIS server node 302 may include multiple processors, multiple cores, or the like, without departing from the scope of the HMIS server node 302 system.

The HMIS server node 302 may also include a non-transitory computer readable medium 312 that may have stored thereon machine-readable instructions executable by the processor 304. Examples of the machine-readable instructions are shown as 314-328 and are further discussed below. Examples of the non-transitory computer readable medium 312 may include an electronic, magnetic, optical, or other physical storage device that contains or stores executable instructions. For example, the non-transitory computer readable medium 312 may be a Random-Access memory (RAM), an Electrically Erasable Programmable Read-Only Memory (EEPROM), a hard disk, an optical disc, or other type of storage device.

The processor 304 may fetch, decode, and execute the machine-readable instructions 314 to receive a search request input data from the at least one user-entity node. The processor 304 may fetch, decode, and execute the machine-readable instructions 316 to evaluate, by a first dedicated LLM, relevance of the search request input data by discerning between primary and secondary information. The processor 304 may fetch, decode, and execute the machine-readable instructions 318 to responsive to evaluation by the first dedicated LLM, derive classifying features from the primary and secondary information and generate a feature vector based on the classifying features. The processor 304 may fetch, decode, and execute the machine-readable instructions 320 to ingest the feature vector into the ML module configured to extract additional search parameters from a predictive search model based on historical search data associated with the at least one user-entity node.

The processor 304 may fetch, decode, and execute the machine-readable instructions 322 to dissect, by a second dedicated LLM, the search request input data and the additional search parameters to separate the data into qualitative and quantitative criteria elements based on the primary and the secondary information. The processor 304 may fetch, decode, and execute the machine-readable instructions 324 to transform, by a third dedicated LLM, the quantitative criteria elements into structured queries for a database.

The processor 304 may fetch, decode, and execute the machine-readable instructions 326 to process, by a fourth dedicated LLM, the qualitative criteria elements by searching through a semi-structured data repository. The processor 304 may fetch, decode, and execute the machine-readable instructions 328 to synthesize, by the fifth LLM, processed search findings into a succinct human-language summary.

The permissioned blockchain 310 may be configured to use one or more smart contracts that manage transactions for multiple participating nodes and for recording the transactions on the ledger 309.

FIG. 4 illustrates a further flowchart of a method for AI-based automated real-time execution of interactive searches based on processing of user search queries data by Large Language Models (LLMs) consistent with the present disclosure.

Referring to FIG. 4, the method 400 may include one or more of the steps described below. FIG. 4 illustrates a flow chart of an example method executed by the HMIS server node 302 (see FIG. 3). It should be understood that method 400 depicted in FIG. 4 may include additional operations and that some of the operations described therein may be removed and/or modified without departing from the scope of the method 400. The description of the method 300 is also made with reference to the features depicted in FIG. 3 for purposes of illustration. Particularly, the processor 304 of the HMIS node 302 may execute some or all of the operations included in the method 400.

With reference to FIG. 4, at block 402, the processor 304 may prepare follow-up questions and additional information by the sixth dedicated LLM. At block 404, the processor 304 may communicate the succinct human-language summary, the follow-up questions and additional information to the at least one user-entity node to instantiate an interactive dialog with a user associated with the at least one user-entity node. Note that the evaluation request data may be any of: live video/audio data; imaging data; textual data and a combination of these types of data.

At block 406, the processor 304 may dynamically refine the search request input data through ongoing feedback and specific requests using the additional search parameters. At block 408, the processor 204 may evaluate the search request input data comprising visual inputs by a dedicated visual input processing LLM. At block 410, the processor 304 may infer design attributes from the visual inputs by the dedicated visual input processing LLM.

At block 412, the processor 304 may supplement a search criterion by the design attributes. At block 414, the processor 304 may fill in potential gaps in textual descriptions by the design attributes. At block 416, the processor 304 may continuously monitor the search request input data to determine if at least one value of search parameters deviates from a previous value of a corresponding search parameter value by a margin exceeding a pre-set threshold value. At block 418, the processor 304 may, responsive to the at least one value of the search parameters deviating from the previous value of the corresponding search parameter by the margin exceeding the pre-set threshold value, generate an updated feature vector for generation of additional search parameters to produce succinct human-language summary by the fifth dedicated LLM. At block 420, the processor 304 may record the synthesized, by the fifth dedicated LLM, the human-language summary along with the search request input data on a permissioned blockchain ledger.

At block 422, the processor 304 may run the plurality of LLMs configured to perform fuzzy semantic matching for capturing a broader range of intentions of a user associated with the at least one user-entity node beyond explicit search terms derived from the search request input data.

In one disclosed embodiment, the search predictive model may be generated by the AI/ML module 307 that may use training data sets to improve accuracy of the prediction of the additional search parameters. The additional search parameters used in training data sets may be stored in a centralized local database. In one embodiment, a neural network (e.g., ANN) may be used in the AI/ML module 307 for the search parameters modeling and report generation.

In another embodiment, the AI/ML module 307 may use a decentralized storage such as a blockchain 310 (see FIG. 3) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers may execute a consensus protocol to validate blockchain 310 storage transactions, group the storage transactions into blocks, and build a hash chain over the blocks. This process forms the ledger 309 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as the search parameters, but which do not fully trust one another.

This application utilizes a permissioned (private) blockchain that operates arbitrary, programmable logic, tailored to a decentralized storage scheme and referred to as "smart contracts" or "chaincodes."

The permissioned blockchain is a type of blockchain network where participation is restricted to authorized entities. In the HMIS, smart contracts may be used to automate the recording of search parameters, updates of HMIS metrics, or generation of NFTs (Non-Fungible Tokens) that are unique digital assets on the blockchain representing ownership or proof of authenticity of a specific item(s). In the HMIS context, an NFT represents a unique search parameters or set of HMIS metrics, providing a tamper-proof record of the search evaluation.

In some cases, specialized chaincodes may exist on blockchain for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

As discussed above, in one embodiment, the features and/or the actions described and/or depicted herein can occur on or with respect to the blockchain 310. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
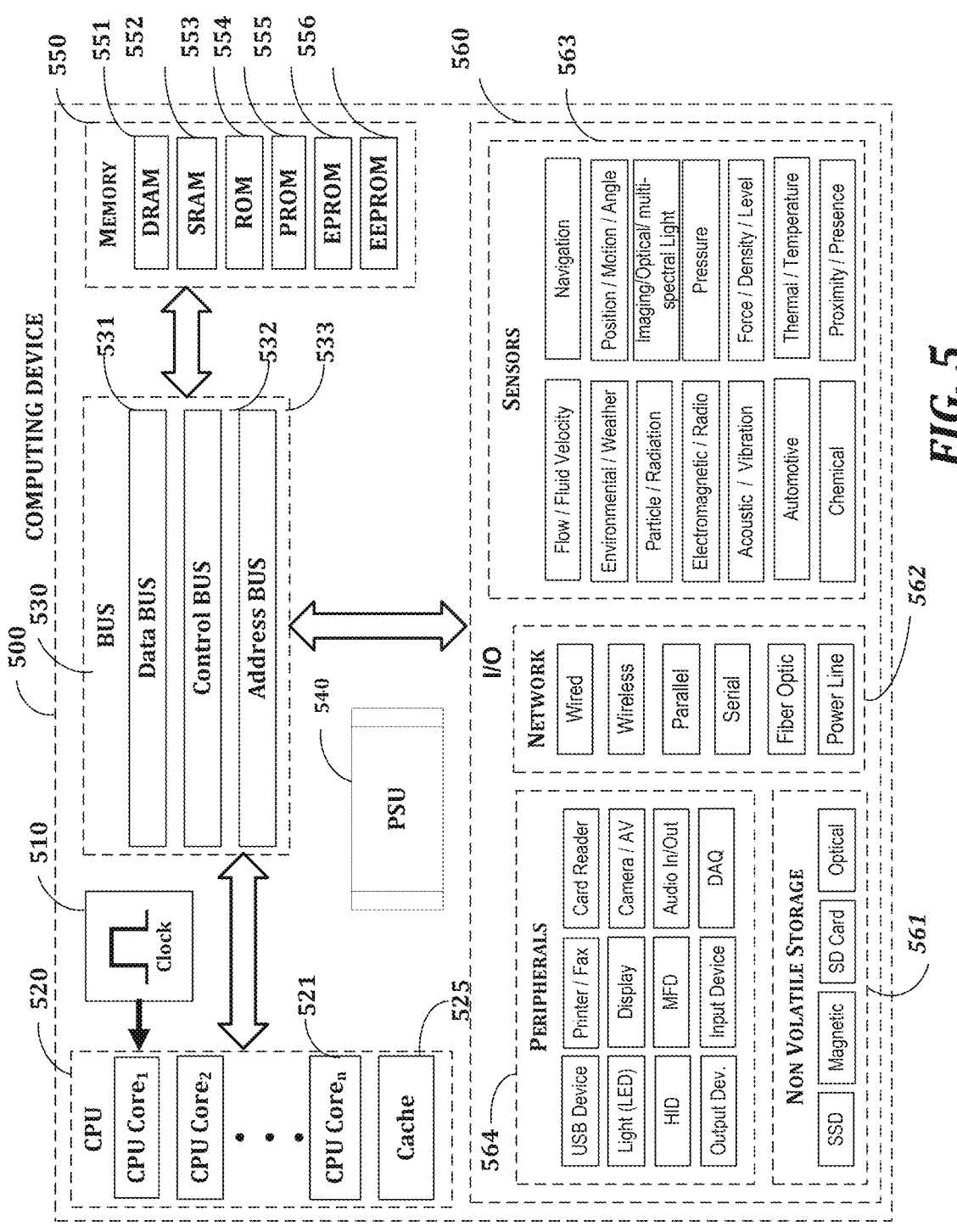
FIG. 5 illustrates a block diagram of a system including a computing device for performing the method of FIGS. 1 and 4.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The HMIS server node 302 (see FIG. 3) may be hosted on a centralized server or on a cloud computing service. Although method 400 has been described to be performed by the HMIS server node 302 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the HMIS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/0 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD–R/DVD+R/DVD–RW/DVD+RW/DVD±RW/DVD+R DL/DVD- RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photo-diode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for execution of interactive searches based on processing of user search queries data by Large Language Models (LLMs), comprising:

a processor of a Human-Machine Interface (HMI) server node configured to host a network of LLMs and at least one machine learning module (ML) and connected to at least one user-entity node over a network; and a memory on which are stored machine-readable instructions that when executed by the processor, cause the processor to:

receive a search request input data from the at least one user-entity node;

evaluate, by a first dedicated LLM, relevance of the search request input data by discerning between primary and secondary information;

responsive to evaluation by the first dedicated LLM, derive classifying features from the primary and secondary information and generate a feature vector based on the classifying features;

ingest the feature vector into the ML module configured to extract additional search parameters from a predictive search model based on historical search data associated with the at least one user-entity node;

dissect, by a second dedicated LLM, the search request input data and the additional search parameters to separate the data into qualitative and quantitative criteria elements based on the primary and the secondary information;

transform, by a third dedicated LLM, the quantitative criteria elements into structured queries for a database;

process, by a fourth dedicated LLM, the qualitative criteria elements by searching through a semi-structured data repository; and synthesize, by a fifth LLM, processed search findings into a succinct human-language summary.

2. The system of claim 1, wherein the machine-readable instructions that when executed by the processor, cause the processor to prepare follow-up questions and additional information by the sixth dedicated LLM.

3. The system of claim 2, wherein the machine-readable instructions that when executed by the processor, cause the processor to communicate the succinct human-language summary, the follow-up questions and additional information to the at least one user-entity node to instantiate an interactive dialog with a user associated with the at least one user-entity node.

4. The system of claim 3, wherein the machine-readable instructions that when executed by the processor, cause the processor to dynamically refine the search request input data through ongoing feedback and specific requests using the additional search parameters.

5. The system of claim 1, wherein the machine-readable instructions that when executed by the processor, cause the processor to evaluate the search request input data comprising visual inputs by a dedicated visual input processing LLM.

6. The system of claim 5, wherein the visual inputs are any of:

digital image data; and video data.

7. The system of claim 5, wherein the machine-readable instructions that when executed by the processor, cause the processor to infer design attributes from the visual inputs by the dedicated visual input processing LLM.

8. The system of claim 5, wherein the machine-readable instructions that when executed by the processor, cause the processor to supplement a search criterion by the design attributes.

9. The system of claim 8, wherein the machine-readable instructions that when executed by the processor, cause the processor to fill in potential gaps in textual descriptions by the design attributes.

10. The system of claim 1, wherein the machine-readable instructions that when executed by the processor, cause the processor to continuously monitor the search request input data to determine if at least one value of search parameters deviates from a previous value of a corresponding search parameter value by a margin exceeding a pre-set threshold value.

11. The system of claim 10, wherein the machine-readable instructions that when executed by the processor, cause the processor to, responsive to the at least one value of the search parameters deviating from the previous value of the corresponding search parameter by the margin exceeding the pre-set threshold value, generate an updated feature vector for generation of additional search parameters to produce succinct human-language summary by the fifth dedicated LLM.

12. The system of claim 1, wherein the machine-readable instructions that when executed by the processor, further cause the processor to record the synthesized, by the fifth dedicated LLM, the human-language summary along with the search request input data on a permissioned blockchain ledger.

13. The system of claim 1, wherein the machine-readable instructions that when executed by the processor, further cause the processor to run the plurality of LLMs configured to perform fuzzy semantic matching for capturing a broader range of intentions of a user associated with the at least one user-entity node beyond explicit search terms derived from the search request input data.

14. A method for execution of interactive searches based on processing of user search queries data by Large Language Models (LLMs), comprising:

receiving, by a Human-Machine Interface (HMI) server node configure to host dedicated LLMs, a search request input data from at least one user-entity node;

evaluating, by a first dedicated LLM, relevance of the search request input data by discerning between primary and secondary information;

responsive to evaluation by the first dedicated LLM, deriving classifying features from the primary and secondary information and generating, by the HMI server node, a feature vector based on the classifying features;

ingesting, by the HMI server node, the feature vector into a machine learning (ML) module configured to extract additional search parameters from a predictive search model based on historical search data associated with the at least one user-entity node;

dissecting, by a second dedicated LLM, the search request input data and the additional search parameters to separate the data into qualitative and quantitative criteria elements based on the primary and the secondary information;

transforming, by a third dedicated LLM, the quantitative criteria elements into structured queries for a database;

processing, by a fourth dedicated LLM, the qualitative criteria elements by searching through a semi-structured data repository; and synthesizing, by a fifth LLM, processed search findings into a succinct human-language summary.

15. The method of claim 14, further comprising preparing follow-up questions and additional information by the sixth dedicated LLM.

16. The method of claim 15, further comprising continuously monitoring the search request input data to determine if at least one value of search parameters deviates from a previous value of a corresponding search parameter value by a margin exceeding a pre-set threshold value.

17. The method of claim 16, further comprising, responsive to the at least one value of the search parameters deviating from the previous value of the corresponding search parameter by the margin exceeding the pre-set threshold value, generate an updated feature vector for generation of additional search parameters to produce succinct human-language summary by the fifth dedicated LLM.

18. The method of claim 14, further comprising dynamically refining the search request input data through ongoing feedback and specific requests using the additional search parameters.

19. The method of claim 14, further comprising inferring design attributes from the visual inputs by the dedicated visual input processing LLM.

20. A non-transitory computer-readable medium comprising instructions, that when read by a processor, cause the processor to perform:

receiving, by a Human-Machine Interface (HMI) server node configured to host dedicated LLMs, a search request input data from at least one user-entity node;

evaluating, by a first dedicated LLM, relevance of the search request input data by discerning between primary and secondary information;

responsive to evaluation by the first dedicated LLM, deriving classifying features from the primary and secondary information and generating, by the HMI server node, a feature vector based on the classifying features;

ingesting, by the HMI server node, the feature vector into a machine learning (ML) module configured to extract additional search parameters from a predictive search model based on historical search data associated with the at least one user-entity node;

dissecting, by a second dedicated LLM, the search request input data and the additional search parameters to separate the data into qualitative and quantitative criteria elements based on the primary and the secondary information;

transforming, by a third dedicated LLM, the quantitative criteria elements into structured queries for a database;

processing, by a fourth dedicated LLM, the qualitative criteria elements by searching through a semi-structured data repository; and synthesizing, by a fifth dedicated LLM, processed search findings into a succinct human-language summary.

\* \* \* \* \*